No. 883,349. PATENTED MAR. 31, 1908.
A. ROUQUIER.
COTTON CLEANER.
APPLICATION FILED OCT. 25, 1907.
3 SHEETS—SHEET 1.
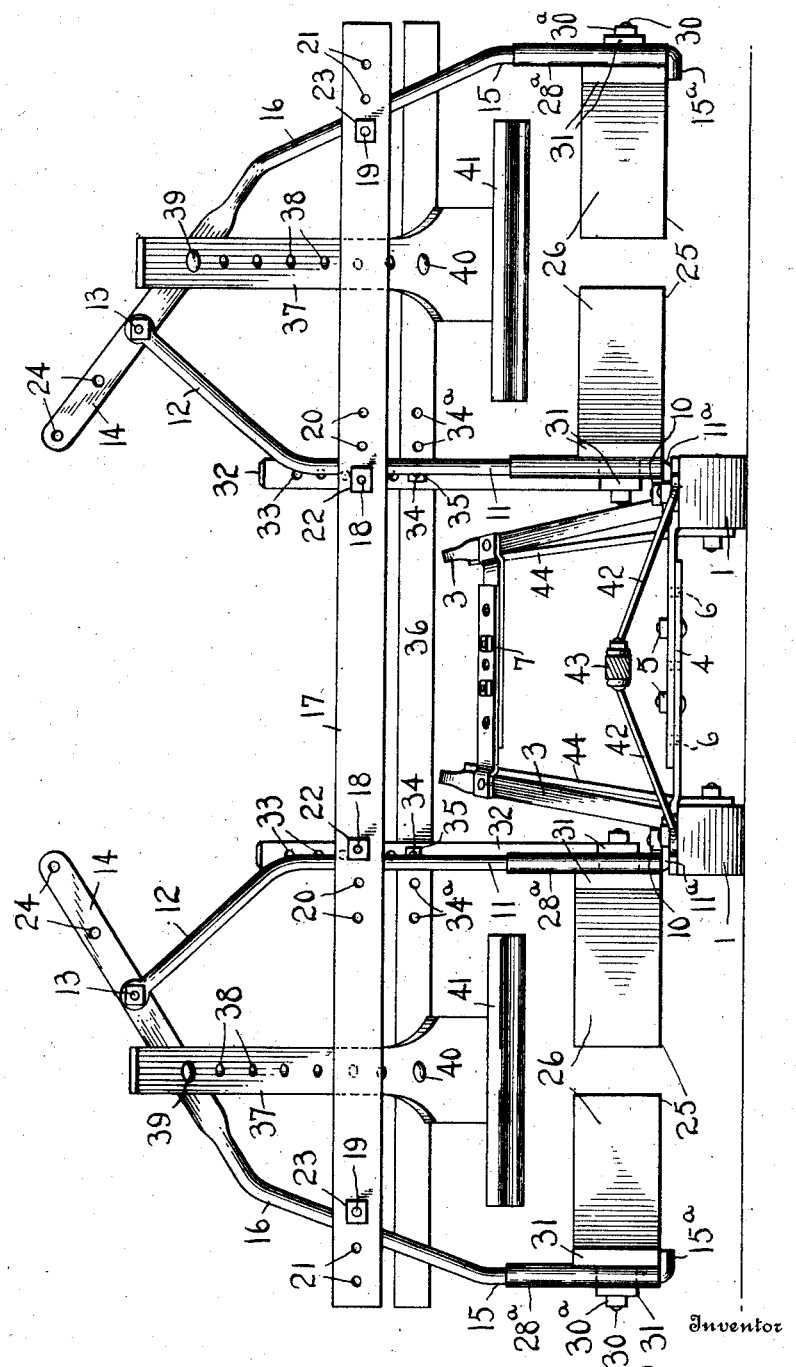

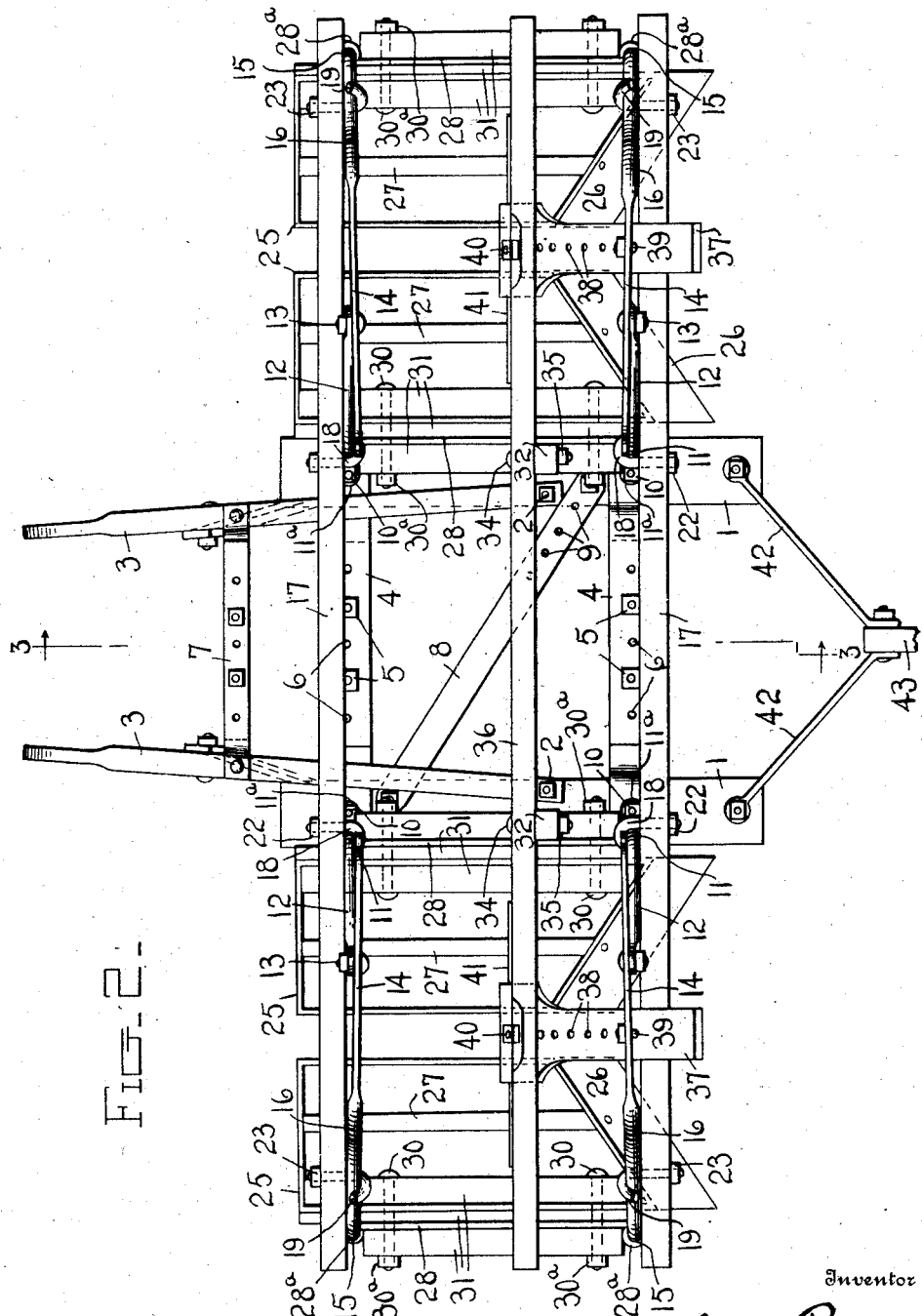

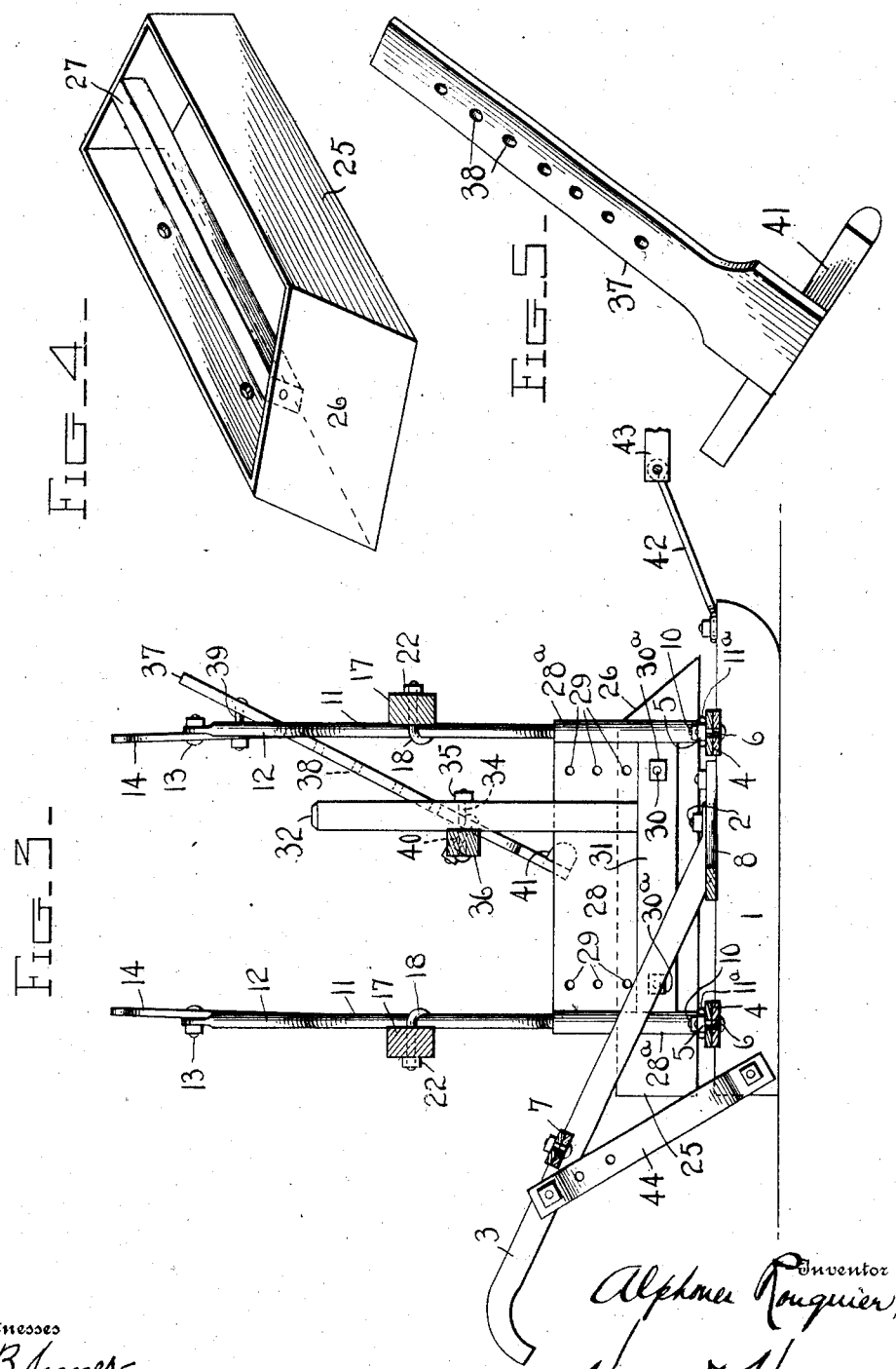

UNITED STATES PATENT OFFICE.

ALPHONES ROUQUIER, OF NATCHITOCHES, LOUISIANA.

COTTON-CLEANER.

No. 883,349.  Specification of Letters Patent.  Patented March 31, 1908.

Application filed October 25, 1907. Serial No. 399,111.

*To all whom it may concern:*

Be it known that I, ALPHONES ROUQUIER, a citizen of the United States, residing at Natchitoches, in the parish of Natchitoches and State of Louisiana, have invented certain new and useful Improvements in Cotton-Cleaners, of which the following is a specification.

This invention relates to new and useful improvements in insect destroyers and more particularly to an apparatus for use in exterminating the cotton boll weevil.

In its broad conception, the invention comprises a machine which employs shoes to travel in the water furrows and from which are supported various adjunctive elements, including poison pans and brushes for knocking the weevils from the plants into the pans.

The invention aims as a primary object to provide in a machine of this type, a novel assemblage of elements whereby the poison pans may be adjusted to varying horizontal or vertical positions in accordance with the degree of growth of the plants.

The invention aims as a further object to provide a machine adapted for use simultaneously with two rows, and which comprehends means for spacing the shoes apart at different positions in accordance with the distance between the rows.

The invention finally aims to provide a novel construction, combination and arrangement of parts, the details of which will appear in the course of the following description in which reference is had to the accompanying drawings forming a part of this specification, like characters of reference designating similar parts throughout the several views wherein:—

Figure 1 is a front elevation of a machine constructed in accordance with the present invention. Fig. 2 is a top plan view thereof. Fig. 3 is a vertical sectional view on the line 3—3 of Fig. 2, looking in the direction of the arrow. Fig. 4 is a detailed perspective view of one of the poison pans, the other pans being similar in construction. Fig. 5 is a detailed perspective view of a brush for knocking the weevils from the bolls.

The shoes which run in the water furrows are designated by the numeral 1 and have pivotal connection by bolt and nut fastenings 2 with rearwardly extending handle members 3, similar to plow handles. The shoes 1 are connected and reinforced by transverse straps 4, of which two are preferably employed, the straps 4 being each formed in two sections, one of which is carried by each of the respective shoes. The sections of each strap are connected by bolt and nut fastenings 5 and in order that such connection may be adjustable, a plurality of openings 6 are provided in each of the sections. It will thus be seen that the straps 4 may be adjusted so as to increase or decrease their length and to effect a corresponding difference in the spacing of the shoes 1. The handle members 3 are connected and reinforced by a strap 7, similar in every respect to the straps 4. The shoes 1 are likewise connected by a diagonal brace member 8, having at one end thereof a series of openings 9 which are provided in order that the fastening of the member 8 may be adjustable to accord with the distance between the shoes 1.

As one side of the machine is an exact duplicate of the other side, the following description will treat only of one side of the machine and is to be understood as applying also to the other side thereof. The fastenings 10 which secure the sections of the straps 4 to the shoes 1 likewise serve as the fastenings for vertical posts 11 and pass through the angular lower apertured ends 11$^a$ of said posts. The posts 11 at their upper ends terminate in angular outwardly inclined portions 12 and the latter are connected by bolt and nut fastenings 13 with the flattened angular end portions 14 of depending posts 15, the latter likewise including inclined body portions 16 disposed at obtuse angles to the portions 14. The posts 11 and 15 are arranged in pairs on each side of the machine and are reinforced by common transverse braces 17 which extend approximately the entire width of the machine. The braces 17 are connected to the respective posts 11 and 15 by hooked bolts designated respectively by the numerals 18 and 19, the bolts 18 and 19 passing through selected ones of a series of openings 20 and 21 in the braces 17 and being held by nuts 22 and 23. The portions 14 are provided with series of openings 24 through which the bolts of the fastenings 13 are selectively engaged, the provision of the openings 24 rendering the connection between the posts 11 and 15 adjustable. The openings 20 and 21 are therefore provided in order that the location of the bolts 18 and 19 may be varied to correspond to the adjustment of the posts 11 and 15.

The poison pans are designated by the numeral 25 and are located in pairs on each side of the machine, said pans having inclined front walls 26, which extend in relatively convergent relation and serve to deflect the limbs of the plants into the space occurring between each respective pair of said pans. Longitudinal brace members 27 have connection with the end walls of said pans.

For the purpose of sustaining the pans 25 metallic side members 28 are employed. The members 28 are provided at each end with apertures 29 arranged in vertical series and through selected ones of which bolts 30 are engaged, the bolts 30 being held by nuts 30$^a$ and passing through wear plates 31 arranged between the side members and the pans, and on the outer sides of the side members and the inner sides of the pans. By virtue of the provision of the apertures 29, the pans 25 may be adjusted vertically with relation to the side members 28. Said side members are provided at their ends with vertical sleeves 28$^a$, preferably integral, which surround the posts 11 and 15, and which rest upon the angular ends 11$^a$ of the posts 11, and the angular ends 15$^a$ of the posts 15.

The innermost of the plates 31 on each side of the machine support a vertical post 32, formed at its upper end with a series of openings 33 through selected ones of which bolts 34 held by nuts 35 are engaged, the bolts 34 serving as fastenings for a transverse brush bar 36 extending approximately the width of the machine, the provision of the openings 33 in series allowing of the adjustment of the brush bar 36 to selected elevations in accordance with the height of the plants. The bolts 34 are engaged through selected ones of series of openings 34$^a$, which latter are provided to permit of lateral adjustment of the posts 32 with relation to the brush bar 36.

The angular portions 14 and the brush bar 36 conjointly support on each side of the machine rearwardly and downwardly inclined bars 37 each having a series of openings 38 to permit of adjustment of said bars, through selected ones of which openings fastening bolts 39 and 40 are passed, the bolts 39 and 40 likewise passing through the respective end portions 14 and the brush bar 36. The bars 37 at their lower ends carry transverse brushes 41 which are arranged above the spaces between the respective pairs of pans 25.

The shoes 1 at their front ends have connection with diagonal braces 42 by which the tongue 43 is held, it being understood that the tongue carries swingle or doubletrees (not shown) to which the draft animals are hitched. The handle members 3 are preferably reinforced with relation to the shoes 1 by diagonal connecting braces 44.

In use, the machine is advanced with the parts on each side thereof overhanging the rows on each side of the water furrow. When the plants are young and not very high, the brushes 41 are employed to knock the weevils from the bolls into the poison pans 25, the latter being filled with any desirable insect exterminating compound, as for instance, coal oil diluted with water. When the plants are of larger growth, the bars 37 and brushes 41 are removed and the weevils are knocked from the bolls by the brush bars 36.

It will be apparent that by virtue of the adjustable connections herein described, the machine as an entirety may have its width increased or decreased; that the pans may be set at selected relative positions towards or away from one another and likewise independent of this adjustment towards or away from the ground; and that the brush bar 36 and the brushes 41 may be set at selected heights in accordance with the degree of growth of the plants.

What I claim is:—

1. In a machine of the type set forth, in combination, a pair of shoes, means for supporting a poison pan at the one side of each of said shoes, adjustable connections between said shoes, members carried by said supporting means and a transverse brush bar connected to said members, said members being adjustable laterally with relation to said brush-bar.

2. In a machine of the type set forth, in combination, a pair of shoes, means for supporting a poison pan at the one side of each of said shoes, adjustable connections between said shoes, members carried by said supporting means and a transverse brush bar connected to said members, and adjustable vertically with relation thereto.

3. In a machine of the type set forth, a pair of shoes, means for supporting a poison pan at one side of each said shoes and transverse braces connecting said means.

4. In a machine of the type set forth, a pair of shoes, means for supporting a poison pan at one side of each of said shoes, adjustable connections between said shoes, and transverse braces connecting said means, said means being adjustable laterally with relation to said braces.

5. In a machine of the type set forth, in combination, a pair of shoes, means for supporting a poison pan at one side of each of said shoes, members carried by said supporting means, a transverse brush bar connected to said members, vertically disposed bars secured to each of said means and transverse brushes carried at the lower ends of said bars.

6. In a machine of the type set forth, in combination, a pair of shoes, means for supporting a poison pan at one side of each of said shoes, a transverse brush bar supported above said pans, and a removably mounted transverse brush supported above each of said pans and disposed below said brush bar.

7. In a machine of the type set forth, in combination, a pair of shoes, means for supporting poison pans in pairs at the outer side of each of said shoes, and connections between said shoes.

8. In a machine of the type set forth, in combination, a pair of shoes, connections between said shoes, and means for supporting poison pans in pairs at one side of each of said shoes, said means including adjustably connected elements for varying the relative positions of said pans.

9. In a machine of the type set forth, in combination, a pair of shoes, connections therebetween, means for supporting poison pans in pairs at one side of each of said shoes, said means including adjustably connected elements for varying the relative positions of said pans and a transverse brush disposed above said pans and adjustably connected to said elements.

10. In a machine of the type set forth, in combination, a pair of shoes, adjustable connections between said shoes, and means for supporting poison pans in pairs at one side of each of said shoes, said means including adjustably connected elements for varying the relative positions of said pans.

11. In a machine of the type set forth, in combination, a supporting member, and means for supporting a pair of poison pans at one side thereof, said means having lateral adjustment.

12. In a machine of the type set forth, in combination, a supporting member, and means for supporting a pair of poison pans at one side thereof, said means having vertical adjustment.

13. In a machine of the type set forth, in combination, a supporting member, and means for supporting a pair of poison pans at one side thereof, said pans having lateral and vertical adjustment.

14. In a machine of the type set forth, in combination, a supporting member, a post secured thereto and having an inclined upper portion, a second post having an inclined upper portion secured to the upper portion of said first named post, poison pans secured to each of said posts and braces connecting said posts.

15. In a machine of the type set forth, in combination, a supporting member, two posts secured thereto, posts connected to each of said first named posts and two poison pans secured to the lower ends of said respective pairs of posts.

16. In a machine of the type set forth, in combination, a supporting post, a poison pan, a side member having a sleeve surrounding said post and connections between said side member and said poison pan.

17. In a machine of the type set forth, in combination, two posts, a side member having sleeves surrounding said posts, a poison pan and connections between said side member and said supporting pan.

18. In a machine of the type set forth, in combination, a post having an angular end, a poison pan, a side member having a sleeve surrounding said post and resting upon said angular end and connections between said side member and said pan.

19. In a machine of the type set forth, in combination, a supporting post, a side member connected thereto, a poison pan, wear plates arranged at the sides of said side member and said pan and connections between said side member and said pan, said connections passing through said wear plates.

20. In a machine of the type set forth in combination, a supporting post, a poison pan, a side member secured to said post, and connections between said side member and said pan, said pan having adjustment with relation to said side member.

21. In a machine of the type set forth, in combination, a supporting post, a poison pan, a side member secured to said post, and connections between said side member and said pan, said pan having vertical adjustment with relation to said side member.

22. In a machine of the type set forth, in combination, two connected posts, poison pans carried thereby, a transverse brush bar, a bar secured to one of said posts and to said brush bar and a brush carried at the lower end of said last named bar.

23. In a machine of the type set forth, in combination, two shoes, a handle member connected to each of said shoes, adjustable connections between said shoes and adjustable connections between said handle members.

In testimony whereof I affix my signature in presence of two witnesses.

ALPHONES ROUQUIER.

Witnesses:
   J. R. JONES,
   TONY OBON.